(12) United States Patent
Leibowitz et al.

(10) Patent No.: US 11,489,703 B2
(45) Date of Patent: *Nov. 1, 2022

(54) EDGE BASED PARTIAL RESPONSE EQUALIZATION

(71) Applicant: Rambus Inc., San Jose, CA (US)

(72) Inventors: Brian S. Leibowitz, San Francisco, CA (US); Hae-Chang Lee, Los Altos, CA (US); Jihong Ren, Sunnyvale, CA (US); Ruwan Ratnayake, Cambridge, MA (US)

(73) Assignee: Rambus Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/953,225

(22) Filed: Nov. 19, 2020

(65) Prior Publication Data

US 2021/0152401 A1    May 20, 2021

Related U.S. Application Data

(63) Continuation of application No. 16/057,604, filed on Aug. 7, 2018, now Pat. No. 10,855,496, which is a continuation of application No. 15/178,493, filed on Jun. 9, 2016, now Pat. No. 10,044,530, which is a continuation of application No. 14/462,561, filed on
(Continued)

(51) Int. Cl.
*H04L 25/03* (2006.01)
*G06F 13/38* (2006.01)

(52) U.S. Cl.
CPC ........ *H04L 25/03057* (2013.01); *G06F 13/38* (2013.01); *H04L 25/0307* (2013.01); *H04L 25/03019* (2013.01); *H04L 2025/03369* (2013.01); *H04L 2025/03617* (2013.01)

(58) Field of Classification Search
CPC .......... H04L 25/03057; H04L 25/0307; H04L 25/03019; H04L 25/03006; H04L 25/03012; H04L 2025/030617; H04L 2025/03592; H04L 2025/03369; H04L 2025/03617

See application file for complete search history.

(56) References Cited

U.S. PATENT DOCUMENTS 7,506,222 B1    3/2009  Talbot
7,639,737 B2   12/2009  Palmer
(Continued)

FOREIGN PATENT DOCUMENTS

EP    1626547 A2    2/2006

OTHER PUBLICATIONS

Brunn, Brian et al., "Edge-Equalization Extends Performance in Multi-Gigabit Serial Links" DesignCon 2005. 13 pages.
(Continued)

*Primary Examiner* — Betsy Deppe
(74) *Attorney, Agent, or Firm* — Lance Kreisman; Peninsula Patent Group

(57) ABSTRACT

An intergrated circuit (IC) chip includes receiver circuitry to receive signals from a second IC chip. The receiver circuitry includes equalization circuitry having at least one tap to equalize the signals. The equalization circuitry includes a tap weight adapter circuit to generate at least one tap weight corresponding to the at least one tap based on edge information of previously received signals.

20 Claims, 7 Drawing Sheets

Related U.S. Application Data

Aug. 19, 2014, now Pat. No. 9,391,816, which is a continuation of application No. 13/932,561, filed on Jul. 1, 2013, now Pat. No. 8,811,553, which is a continuation of application No. 12/513,898, filed as application No. PCT/US2007/023600 on Nov. 9, 2007, now Pat. No. 8,477,834.

(60) Provisional application No. 60/859,820, filed on Nov. 16, 2006.

(56) References Cited

U.S. PATENT DOCUMENTS

| | | | |
|---|---|---|---|
| 8,243,783 | B2 | 8/2012 | Palmer |
| 10,044,530 | B2 | 8/2018 | Leibowitz et al. |
| 10,855,496 | B2 * | 12/2020 | Leibowitz ........... H04L 25/0307 |
| 2004/0203559 | A1 | 10/2004 | Stojanovic et al. |
| 2005/0195893 | A1 | 9/2005 | Brunn et al. |
| 2006/0188043 | A1 | 8/2006 | Zerbe et al. |
| 2006/0233291 | A1 | 10/2006 | Garlepp et al. |
| 2006/0280272 | A1 | 12/2006 | Stojanovic |
| 2007/0002942 | A1 | 1/2007 | Simpson et al. |
| 2007/0195874 | A1 | 8/2007 | Aziz et al. |
| 2008/0069276 | A1 | 3/2008 | Wong et al. |

OTHER PUBLICATIONS

International Search Report dated Sep. 4, 2008 in connection with corresponding International Application No. PCT/US2007/023600. 15 pages.

Ren, Jihong et al., "Performance Analysis of Edge-Based DFE", EPEP 2006 Slides. 12 Pages.

Ren, Jihong et al., "Performance Analysis of Edge-Based DFE", IEEE 15th Topical Meeting on Electrical Performance of Electronic Packaging, held in Scottsdale, AZ, USA Oct. 23, 2006, pp. 265-268. 4 pages.

* cited by examiner

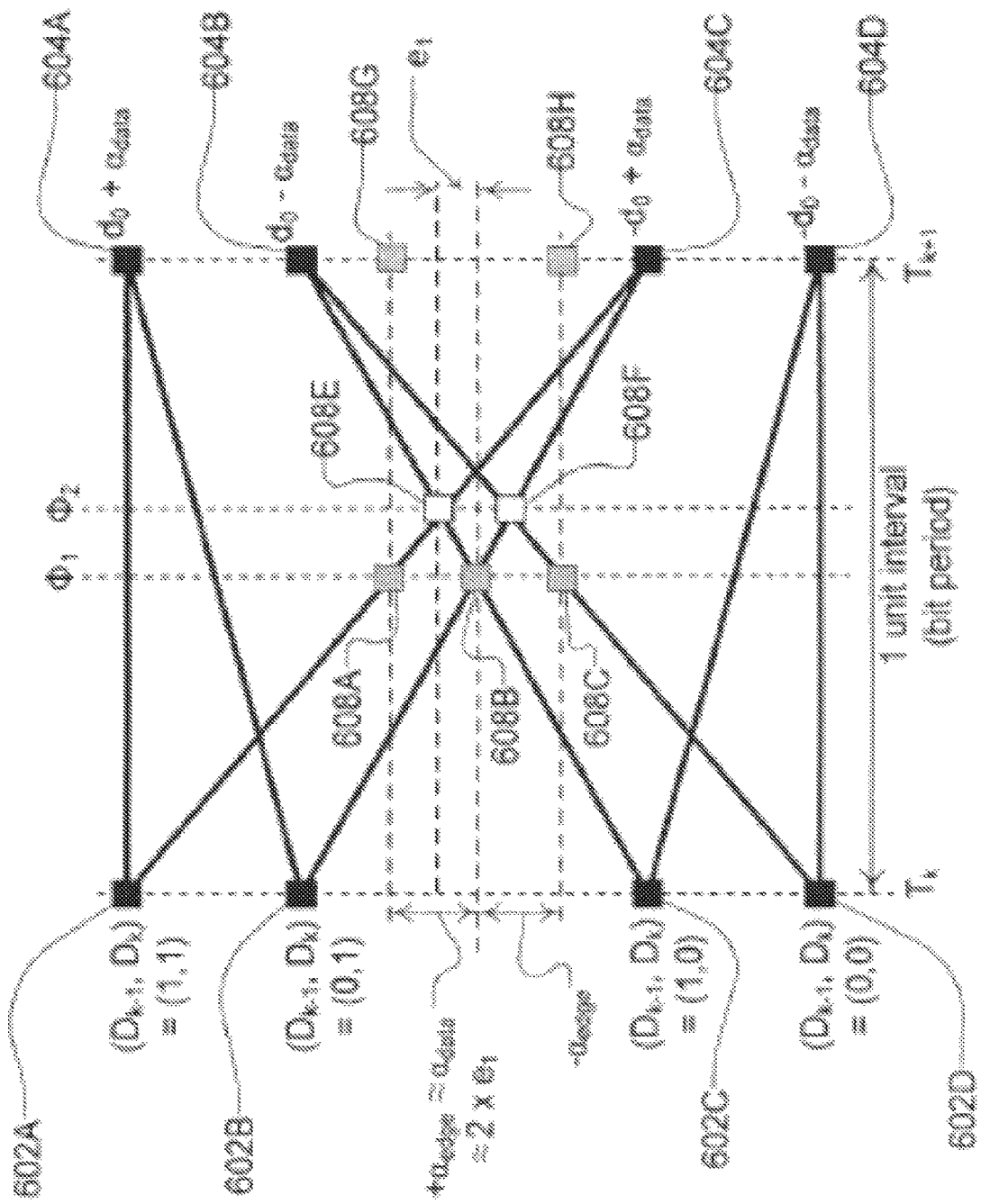

EDGE BASED PARTIAL RESPONSE EQUALIZATION

CROSS-REFERENCES TO RELATED APPLICATIONS

This application is a Continuation of U.S. application Ser. No. 16/057,604, filed Aug. 7, 2018, which is a Continuation of U.S. application Ser. No. 15/178,493, filed Jun. 9, 2016, now U.S. Pat. No 10,044,530, which is a Continuation of U.S. application Ser. No. 14/462,561, filed Aug. 19, 2014, now U.S. Pat. No. 9,391,816, which is a Continuation of U.S. application Ser. No. 13/932,561, filed Jul. 1, 2013, now U.S. Pat. No. 8,881,553, which is a Continuation of U.S. application Ser. No. 12/513,898, filed Dec. 23, 2009, now U.S. Pat. No. 8,477,834, which is the national phase entry of international Application No. PCT/US2007/023600, filed Nov. 9, 2007, which claims the benefit of priority to U.S. Provisional Application No. 60/859,820, filed Nov. 16, 2006; all of the priority claims are hereby incorporated by reference in their entirety for all purposes. 8,881,553, which is a Continuation of U.S. application Ser. No. 12/513,898, filed Dec. 23, 2009, now U.S. Pat. No. 8,477,834, which is the national phase entry of international Application No. PCT/US2007/023600, filed Nov. 9, 2007, which claims the benefit of priority to U.S. Provisional Application No. 60/859,820, filed Nov. 16, 2006; all of the priority claims are hereby incorporated by reference in their entirety for all purposes.

BACKGROUND

The performance of conventional digital systems is limited by the transmission interconnection between integrated circuits. In such systems, a transmitter sends data onto a channel by setting a signal parameter of an output signal, such as current or voltage, to one of a plurality of discrete values during each of a succession of intervals referred to herein as data intervals. The data is in turn received by a receiver on the channel. The receiving IC device needs to be able to recognize the discrete values set by the transmitter in the data so it may be used in the receiving IC device.

The transmitted data typically experiences corruption as it propagates through the channel from the transmitter to the receiver. Such corruption can cause pre and post inter-symbol interference (ISI) and make it more difficult, or impossible, for some receivers to determine the value of the signal parameter during each individual data interval. The corruption which causes ISI may arise from frequency dependent attenuation in the signal path, reflections from impedance discontinuities in the signal path, or other factors. Typically, signal components at higher frequencies are attenuated to a greater degree than signal components at lower frequencies. These problems typically become more significant in high-performance systems where data is transmitted at a high data rate Equalization schemes may be used in high-performance communication links to compensate for all or part of the corruption imposed by the channel and thus maintain an acceptable error rate. For example, equalization may include processes for emphasizing or attenuating a selected frequency or frequencies of a signal, often to compensate for frequency-specific attenuation of the signal.

It would be desirable to implement receivers with equalization components in such systems in a manner that improves circuit design while effectively maintaining or improving data throughput.

BRIEF DESCRIPTION OF DRAWINGS

The present technology is illustrated by way of example, and not by way of limitation, in the figures of the accompanying drawings, in which like reference numerals refer to similar elements including:

FIG. 6B is an eye diagram showing data levels and transitions corresponding to the single bit response shown in FIG. 6A.

DETAILED DESCRIPTION

Figure 1:
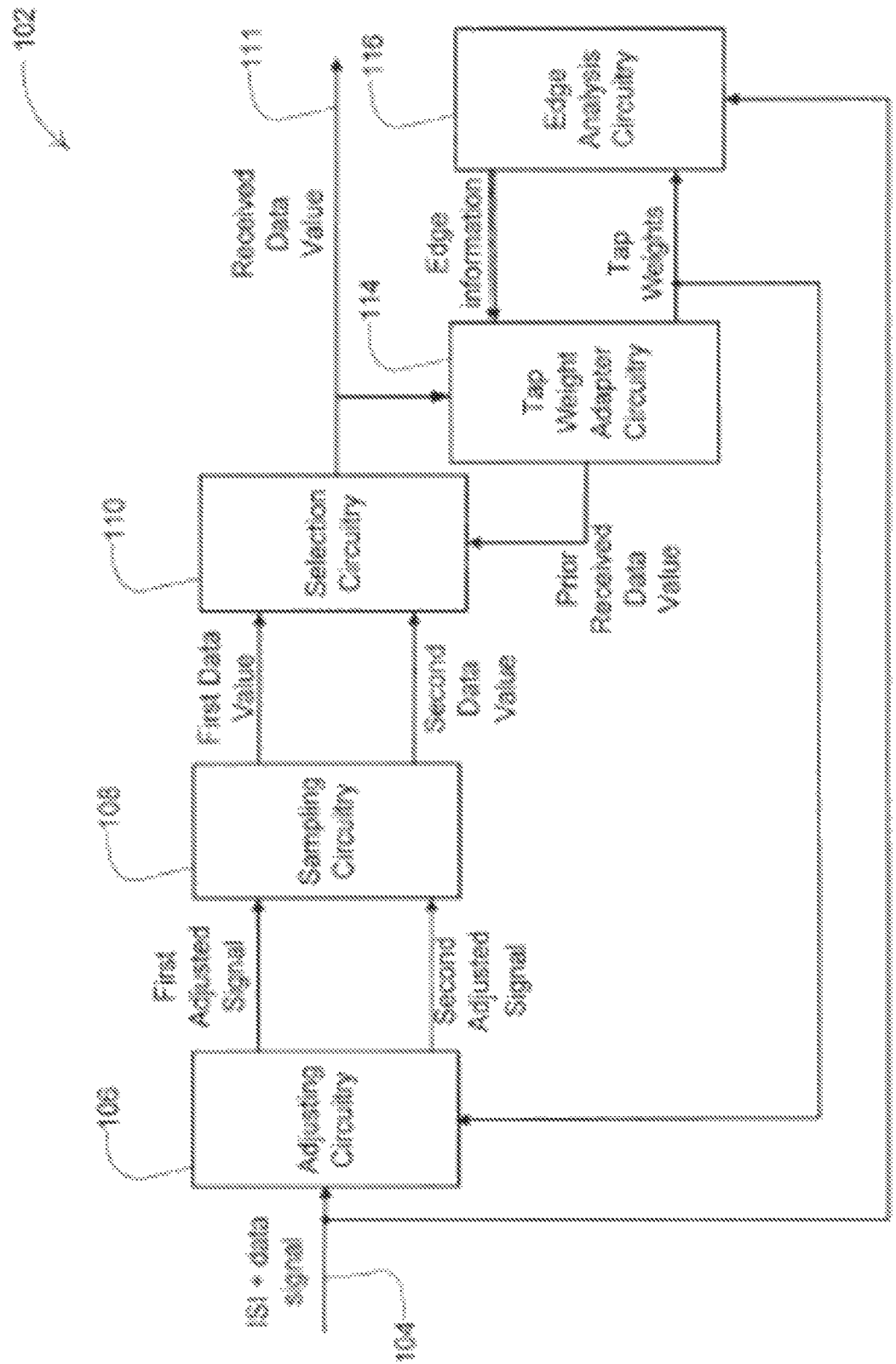
FIG. 1 is a block diagram of components of an edge-based partial response decision feedback equalizer of the present receiver technology.

An equalizer circuit 102, such as the edge-based partial response decision feedback equalizer (prDFE) for receiving a data signal according to one embodiment of the present technology is illustrated in FIG. 1. The equalizer includes adjusting circuitry 106, sampling circuitry 108, selection circuitry 110, tap weight adapter circuitry 114 and edge analysis circuitry 116. As shown in FIG. 1, a transmitted data signal affected by inter-symbol interference ("ISI") enters adjusting circuitry 106 where it is adjusted by the tap weights generated by the tap weight adapter circuitry 114. Tap weights may be derived or generated to have the same or different quantities and may also be positive and negative versions of the same tap weight or quantity (e.g., tap weight value A is equal to the absolute value of tap weight value B).

As shown in FIG. 1, the adjusting circuitry 106 produces a first adjusted signal and second adjusted signal. Typically, the first and second adjusted signals are derived based on separately combining (e.g., adding or subtracting) a tap weight to the ISI and data signal 104 to counteract, reduce or eliminate the ISI. The first and second adjusted signals are then input to the sampling circuitry 108. In the sampling circuitry 108, the respective adjusted signals are sampled to produce first and second data values.

The first and second data values are input to the selection circuitry 110. Prior received data values are also input to the selection circuitry 110. The selection circuitry 110 selects one of the first and second data values based on a prior received data value. The selected value of the selection circuitry 110 is output as the received data value 111.

As previously mentioned, the tap weight adapter circuitry 114 generates the tap weights. In this operation, the tap weights are derived with edge information input from the edge analysis circuitry 116 and received data values 111. The edge analysis circuitry 116 produces the edge information based on the received data signal 104. The edge analysis circuitry 116 may further derive the edge information using the tap weights from the tap weight adapter circuitry 114.

Figure 2:
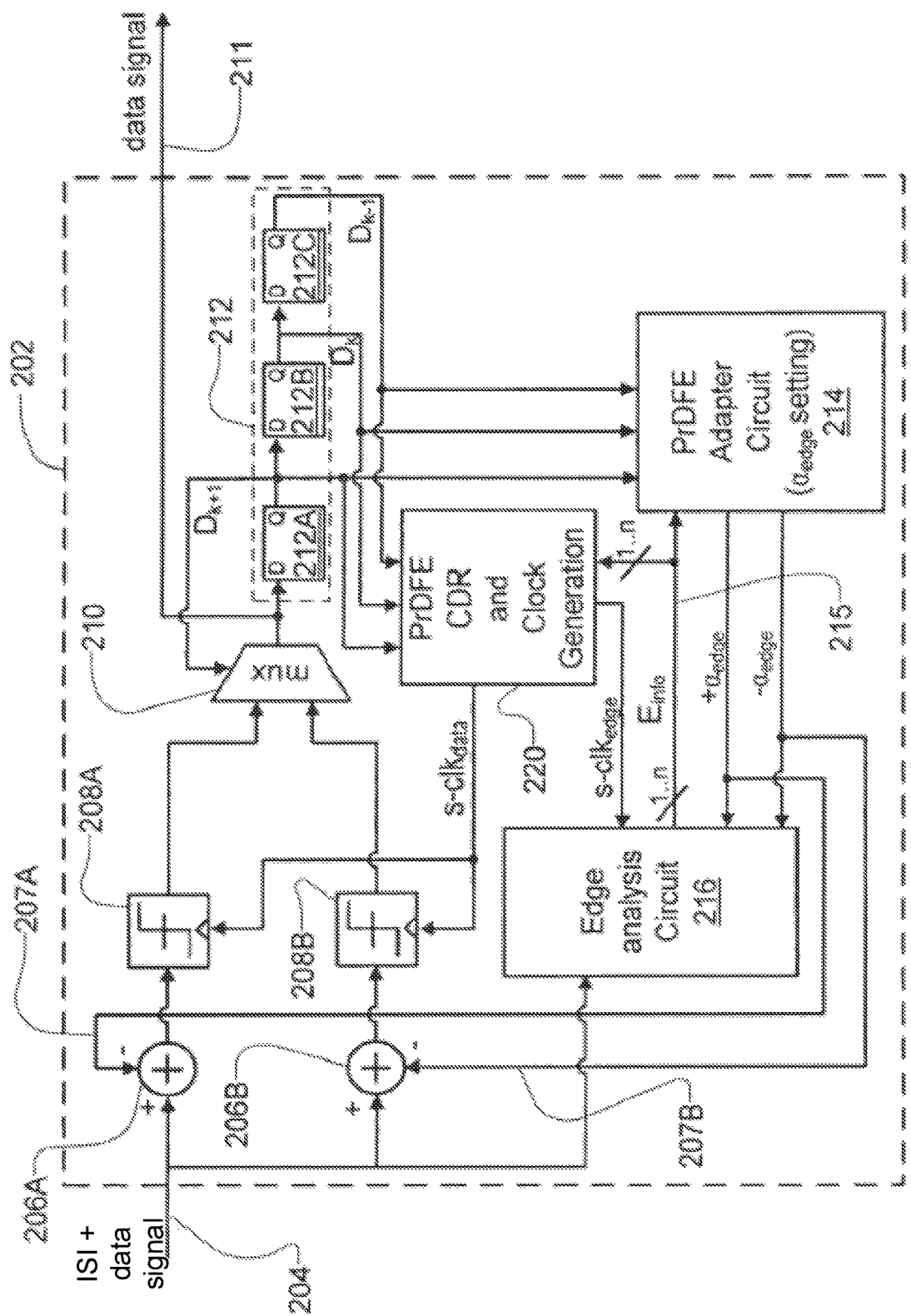
FIG. 2 is a further embodiment of an edge-based partial response decision feedback equalizer of the present receiver technology.

A further embodiment of a receiver of the present technology is illustrated in FIG. 2. As shown in FIG. 2, the received data signal 204 is input to the equalizer circuit 202. In the event that high speed data transmission is utilized, the received data signal will typically be affected by ISI as previously mentioned. The received data signal 204 is applied to adders 206A, 206B. The adders separately combine the received data signal 204 with first and second tap weight signals 207A, 207B to adjust the input data signal 204 so as to derive respective first and second adjusted signals. The tap weight signals have also been designated in FIG. 2 as the "+$\alpha_{edge}$" signal and the "−$\alpha_{edge}$" signal and may also be referred to as equalization coefficients. The purpose of this adding or adjusting operation is to cancel ISI generated by the previously received bit.

The first and second adjusted signals from adders 206A, 206B are input to data samplers 208A, 208B. Sampling operations by the data samplers are controlled by a data clock signal s-clk$_{data}$. The data clock signal s-clk$_{data}$ permits sampling of the incoming signal in the data eye of the received data signal 204. The output of the data samplers 208A, 208B are then supplied to a mux 210. The mux 210 is configured for deciding or selecting between one or the other of the output signals from the data samplers 208A, 208B. A control input of the mux is connected with a prior received data value as will be discussed in more detail herein such that mux 210 can make a selection based on prior received data, which effectively decides which adjustment (e.g., either of the alpha values+$\alpha_{edge}$ or −$\alpha_{edge}$) to the received data signal 204 should be utilized for the presently received data bit. The data signal output 211 from the mux 210 comprises a digital logic sequence of data values sampled from the received data signal in a manner that compensates for inter-symbol interference in the received data signal 204.

The output of the mux 210 is also fed to a data retention circuit 212. The data retention circuit 212 may be formed by a plurality of latches, flip-flops, or the like for retaining consecutive data values or bits received and produced at the output of mux 210. As illustrated in the embodiment of FIG. 2, flip-flop 212A is set in each consecutive system cycle by the output of the mux 210. The output of the flip-flop 212A sets flip-flop 212B and the output of flip-flop 212B sets flip-flop 212C. Thus, the data retention circuit 212 consecutively stores or retains data values $D_{k+1}$, $D_k$ and $D_{k-1}$ from the mux 210 such that an immediately preceding received data value $D_{k+1}$ from the presently received data value is stored by flip-flop 212A, its immediately preceding received data value $D_k$ is stored by flip-flop 212B and its immediately preceding received data value $D_{k-1}$ is stored by flip-flop 212C. Although three data values are stored by the data retention circuit 212 in this embodiment, fewer or more such prior data values or bits may be retained and additional latches or flip-flops provided depending on the desired control logic of additional components of the equalizer 202 as will be discussed herein.

The equalizer circuit 202 will also typically include a tap weight adapter circuit 214 for setting the tap weight signals applied to adders and 206A and 206B. In this edge-based implementation, the determined tap weight signals can be a direct measure of error information attributable to ISI at the edge of the data signal eye, which in turn may be utilized to correct the data signal for making the data detection at the center of the data eye with one of the data samplers 208A, 208B. Thus, as will be explained in more detail herein, the tap weight adapter circuit 214 includes logic circuits to generate the first and second tap weight signals 207A, 207B in accordance with one or more signals from an edge analysis of the received data signal 204. Thus, one or more edge information signal 215, also designated in FIG. 2 as "$E_{info}$", is input to the logic circuits of the tap weight adapter circuit 214. Moreover, the tap weight adapter circuit 214 generates the first and second tap weight signals 207A, 207B in accordance with prior received data values of the data retention circuit 212. Thus, data values $D_{k+1}$, $D_k$ and $D_{k-1}$ are input to the tap weight adapter circuit 214 for use in the logic applied by the tap weight adapter circuit 214.

Consequently, the equalizer circuit 202 of the present technology may also include an edge analysis circuit 216. The edge analysis circuit 216 is configured to conduct an edge analysis of the received data signal 204 utilizing the tap weight signals from the tap weight adapter circuit 214. The edge analysis circuit 216 will typically include edge samplers configured to sample the received data signal at an expected edge time associated with the receive data signal as will be discussed in more detail herein. Thus, the edge analysis circuit 216 will operate based on input of an edge clock signal s-clk$_{edge}$. in this embodiment, the output of the edge analysis circuit 216 is applied to the tap weight adapter circuit 214 as previously mentioned. The edge information signal 215 input to the tap weight adapter 214 is also applied to a timing generator 220.

The equalizer circuit 202 will also typically operate in conjunction with a timing generator 220. Since components of the equalizer circuit utilize samplers for sampling the data eye of the received data signal 204 and the edges of the data eye of the received data signal 204, the timing generator 220 may generate both the data clock signal s-clk$_{data}$ and the edge clock signal s-clk$_{edge}$. The timing generator 220 may include components to generate the data clock signal s-clk$_{data}$ by any known Clock Data Recovery (CDR) method and may include DLL and/or PLL circuit components or the like to implement the method. The timing generator 220 may then generate the edge clock signal s-clk$_{edge}$ by adjusting the phase of the determined s-clk$_{data}$ signal to produce the edge clock signal s-clk$_{edge}$.

As discussed in more detail herein, in one embodiment, logic circuits of the timing generator 220 may implement a method in generating the edge clock signal s-clk$_{edge}$ based on data from the received data signal 204 and edge information from the edge analysis circuit 216. Thus, data values $D_{k+1}$, $D_k$ and $D_{k-1}$ from the data retention circuit 212 and edge information signal 215 ($E_{info}$) from the edge analysis circuit 216 may be applied as input to the timing generator 220 so that the phase of the edge clock signal s-clk$_{edge}$ may be adjusted such as by controlling an increase or decrease to the phase of the signal with the logic circuits based on the data values and the edge information.

In operation, equalizer circuit 202, which can serve as an edge-based prDFE receiver, makes two speculative decisions each cycle, one assuming the previously received bit (e.g., data value $D_{k+1}$) is high and the other one assuming the previously received bit is low. This corresponds to the two adjustments made to the received data signal 204 at adders 206A, 206B based on the determined tap weight signals 207A, 207B and the two subsequent sampling operations of the resultant signals with the data samplers 208A, 208B. Once the previous bit is resolved (i.e., data value $D_{k+1}$), it is used to select the correct speculative decision. This corresponds with the control of the mux 210 by data value $D_{k+1}$ from the data retention circuit 212. In this embodiment, the top input of the MUX is selected when $D_{k+1}$ is a high value.

Despite the fact that the tap weight signals 207A, 207E have been determined based on a measure of ISI at the edge of the data eye of the received data signal 204, they are nevertheless used as a measure to adjust the received data signal 204 to cancel ISI in the data eye and thereby permit more accurate sampling of data values from the data eye of the received data signal 204. This may be accomplished without the need for an extra adaptive sampler as may be utilized by other equalizer implementations.

Figure 3:
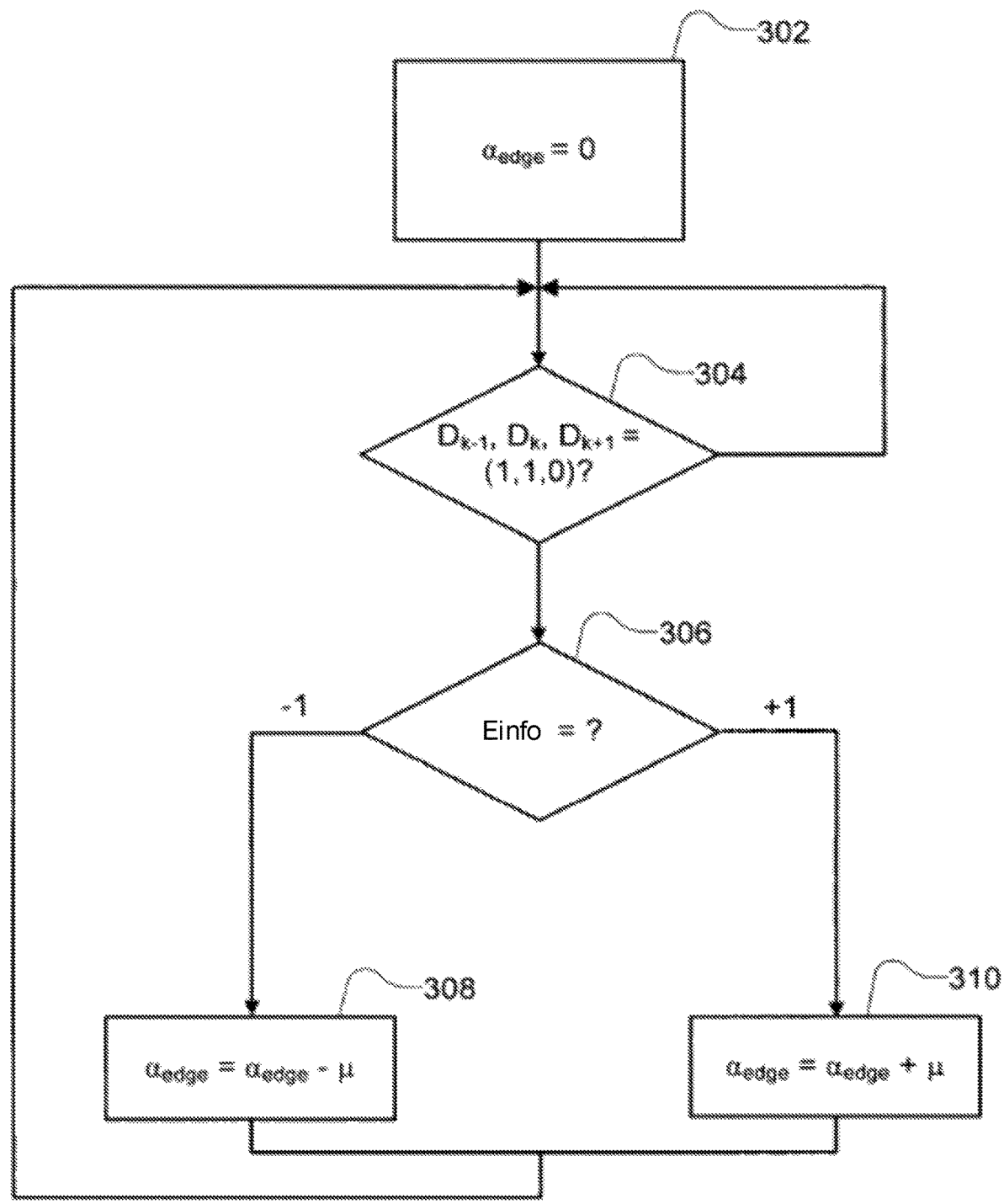
FIG. 3 is a logic diagram illustrating suitable logic that may be implemented by an edge-based tap weight adaptor circuit for one embodiment of the present technology.

In one embodiment of the technology, the tap weight adapter circuit 214 may be implemented with logic circuits so as to set at least one of the tap weight signals (e.g., $+\alpha_{edge}$) according to the method illustrated in FIG. 3. In the method, the $\alpha_{edge}$, is initially set to zero representing no ISI at step 302. Based on the input data values $D_{k+1}$, $D_k$ and $D_{k-1}$ from the data retention circuit 212, the method continuously checks for the condition of consecutively received data bits, such as received data bits of "110" as shown in step 304. As will be discussed in more detail herein, an implementation with this particular sequence of "110" of the received data bits will depend on which particular edge sampler of the edge analysis circuit 216 is being considered for purposes of obtaining edge information. Thus, other patterns may be implemented if based on other edge samplers. In step 304, if the "110" condition is found, process flows to step 306. In step 306, the edge information signal 215 ($E_{info}$) from an edge sampler of the edge analysis circuit 216 is checked. If the signal is low, process flows to step 308. If the signal is high, process flows to step 310.

In step 308, the $\alpha_{edge}$ tap weight signal is decreased by some nominal amount (i.e., "μ"). In step 310, the $\alpha_{edge}$ tap weight signal is increased by some nominal amount (i.e., "μ"). Operational flow then returns to step 304 from both step 308 and step 310. Given the continuous operation of the equalizer circuit 214 and the tap weight adapter circuit 214, this process yields a $\alpha_{edge}$ tap weight signal with a derived value that produces 50% high and 50% low signals from the utilized edge sampler of the edge analysis circuit 216. Thus, the equalizer coefficients can be continuously refined based on edge information from the received data signal. The $-\alpha_{edge}$ tap weight signal 207B may be derived in parallel with the positive signal by using a negative nominal amount (i.e., "−μ") in a comparable method to the one illustrated in FIG. 3. Alternatively, it may be determined from the $\alpha_{edge}$ tap weight signal 207A by negating its value with appropriate circuit components.

Figure 4:
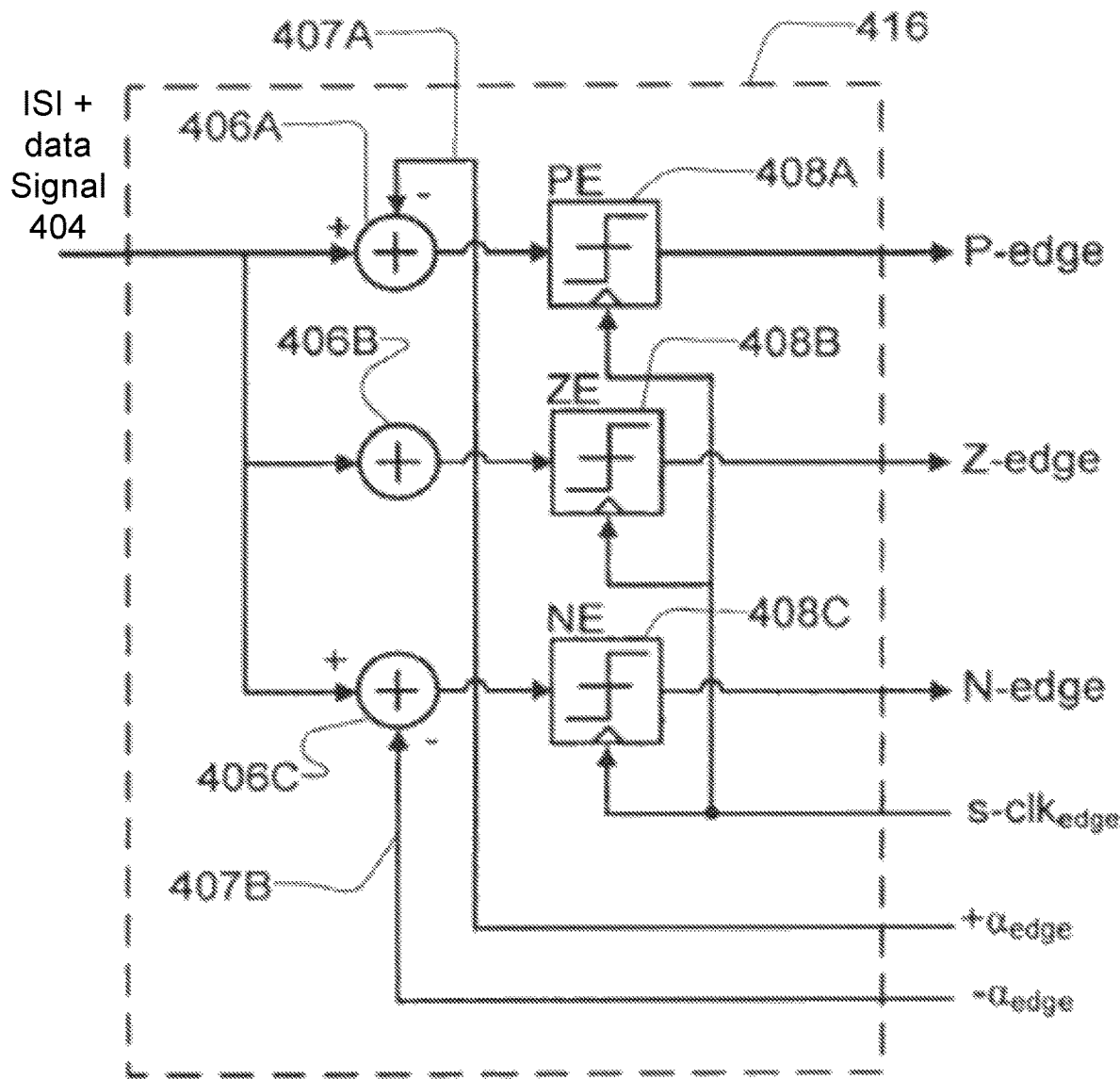
FIG. 4 is an embodiment of an edge analysis circuit suitable for implementation in the edge-based partial response decision feedback equalizer of the present receiver technology.

In one embodiment, the edge analysis circuit 416 may be implemented as illustrated in FIG. 4. In the embodiment, the received data signal 404 is supplied to adders 406A, 406B, 406C. In adder 406A, the received data signal 404 is combined with tap weight signal 407A (i.e., $+\alpha_{edge}$). The output of adder 406A is input to an edge sampler 408A, also labeled as the "PE" or positive edge sampler. The received data signal 404 is also input to adder 406B. In the adder 406B, a null signal is added so as not to modify the received data signal 404. The adder 406S is implemented so as to maintain the respective signal synchronism between the outputs of the adders 406A, 406B, 406C. The output of adder 406S is input to an edge sampler 408S, also labeled as the "ZE" or zero edge sampler. In adder 406C, the received data signal 404 is combined with tap weight signal 407E (i.e., $-\alpha_{edge}$). The output of adder 406C is then input to an edge sampler 408C, also labeled as the "NE" or negative edge sampler. By adjusting the received data signal 404 by the tap weight signals 407A, 407B it effectively modifies the detection of input signal levels made by the edge samplers without actually modifying the thresholds of the edge samplers.

For this embodiment, the P-edge output, Z-edge output and the N-edge output shown in FIG. 4 are each applied to the timing generator 220 as three edge information signals for use by the timing generator. However, at least only one edge information signal from the edge analysis circuit may be provided to the tap weight adapter circuit 214 as discussed with respect to the method as illustrated in FIG. 3. For example, in such an embodiment, the P-edge output signal may be applied to the tap weight adapter circuit 214 such that its determination may be a function of or based on information of the edge of the data eye(s) of the received data signal. Nevertheless, more edge information signals may be provided to the tap weight adapter circuit 214, such as also from the negative edge sampler, to check more than a signal sampler of the edge analysis circuit 216, if desired by modifying the steps of the method of FIG. 3 accordingly.

Figure 5:
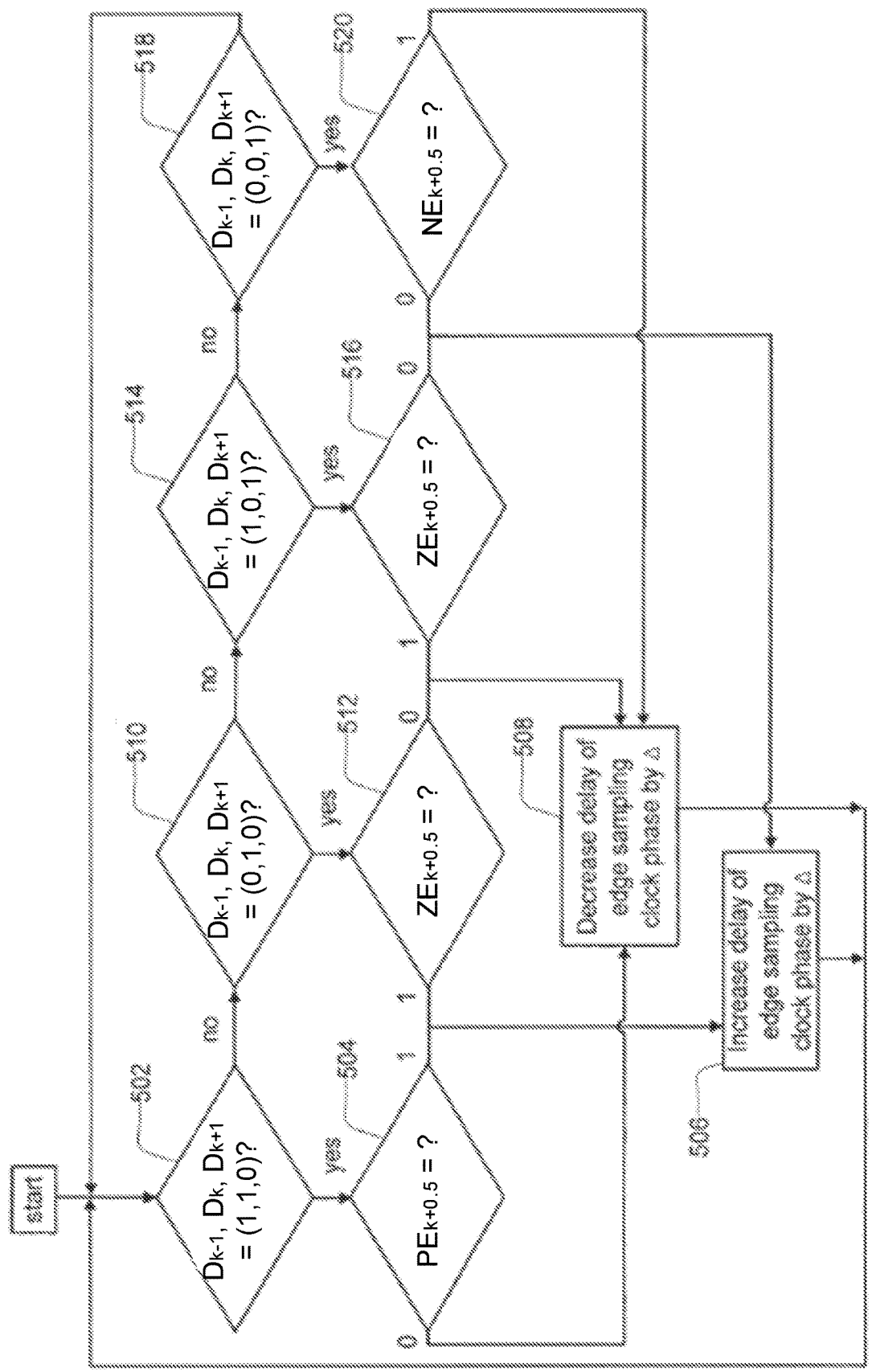
FIG. 5 shows an example methodology that may be employed by logic circuits of a timing generator that is suitable for an equalizer of the present receiver technology.

In one embodiment of the technology, the timing generator 220 may be implemented with logic gates so as to generate the edge clock signal s-clk$_{edge}$ in accordance with a method illustrated by the flow chart of FIG. 5. With each changing data value in the data retention circuit 212, logic circuits associated with the timing generator 220 will check the data values $D_{k-1}$, $D_k$ and $D_{k+1}$ for patterns of either "110", "010" or "101" respectively. The process uses the comparison results to decide which particular edge sampler of the edge analysis circuit 216 should be considered at sample time k+0.5 for adjusting the phase of the edge clock signal s-clk$_{edge}$. Thus, at step 502, if data values $D_{k-1}$, $D_k$ and $D_{k+1}$ are "110" respectively then output of the PE edge sampler 408A is considered at step 504. In step 504, if the PE edge sampler 408A is high, then a delay of a phase of the edge sampling signal s-clk$_{edge}$ will be increased by some nominal delta Δ at step 506. In step 504, if the PE edge sampler 408A is low, then the delay of a phase of the edge sampling signal s-clk$_{edge}$ will be decreased by some nominal delta Δ at step 508.

Moreover, at step 510, if data values $D_{k-1}$, $D_k$ and $D_{k+1}$ are "010" respectively then output of the ZE edge sampler 408B at sample time k+0.5 is considered at step 512. In step 512, if the ZE edge sampler 408B is high, then a delay of a phase of the edge clock signal s-clk$_{edge}$ will be increased by some nominal Δ at step 506. In step 512, if the ZE edge sampler 408B is low, then the delay of a phase of the edge sampling signal s-clk$_{edge}$, will be decreased by some nominal delta Δ at step 508.

Additionally, at step 514, if data values $D_{k-1}$, $D_k$ and $D_{k+1}$ are "101" respectively then the ZE edge sampler 408B at sample time k+0.5 is considered at step 516. In step 516, if the ZE edge sampler 408B is low, then a delay of a phase of the edge sampling signal s-clk$_{edge}$ will be increased by some nominal Δ at step 506. In step 516, if the ZE edge sampler 408B is high, then the delay of a phase of the edge sampling signal s-clk$_{edge}$ will be decreased by some nominal delta Δ at step 508.

Finally, at step 518, if data values $D_{k-1}$, $D_k$ and $D_{k+1}$ are "001" respectively then the NE edge sampler 408C at sample time k+0.5 is considered at step 520. In step 520, if the NE edge sampler 408C is low, then a delay of a phase of the edge sampling signal s-clk$_{edge}$ will be increased by some nominal Δ at step 506. In step 516, if the ZE edge sampler 408A is high, then the delay of a phase of the edge sampling signal s-clk$_{edge}$ will be decreased by some nominal delta Δ at step 508.

Although the edge analysis circuit 216 may be constructed for operation with at least three edge samplers as previously described and shown in FIG. 4, an alternative embodiment may utilize two edge samplers, such as, the ZE edge sampler and either one of the PE and NE edge samplers. In such an embodiment, the logic circuits implemented by the timing generator 220 would then be based on two edge information signals from the edge analysis circuit 216. For example, the "Z-edge" information signal and either one of the "P-edge" information signal or the "N-edge" information signal shown in FIG. 4 may be input to the timing generator 220. In this embodiment, a method as illustrated in FIG. 5 would be implemented in the timing generator 220 to only consider "110", "010" and "101" data value conditions (e.g., steps 502, 510 and 514 of FIG. 5) if the PE edge sampler is used with the ZE edge sampler for increasing or decreasing the clock phase delay for the edge clock signal s-clk$_{edge}$. Alternatively, a method as illustrated in FIG. 5 would be implemented in the timing generator 220 to only consider "101", "010" and "001" data value conditions (e.g., steps 510, 514 and 518 of FIG. 5) if the NE edge sampler is used with the ZE edge sampler for increasing or decreasing the clock phase delay for the edge clock signal s-clk$_{edge}$.

Consequently, in this two edge sampler embodiment or the three edge sampler embodiment, the method of the logic circuits of the tap weight adapter circuit 214 as illustrated in FIG. 3 would be based on input from either the PE edge sampler or the NE edge sampler when present. Thus, at step 306 of the method illustrated in FIG. 3, if the edge analysis circuit 216 implements the PE edge sampler and the ZE edge sampler, then the sample from the PE edge sampler could be checked (as E$_{k+0.5}$) and the remaining aspects of the process of FIG. 3 would remain the same.

Alternatively, if the edge analysis circuit 216 implements the NE edge sampler and the ZE edge sampler at 306 and not the PE edge sampler in the method illustrated in FIG. 3 with respect to a two edge sampler embodiment, then the sample from the NE edge sampler would be checked at 306. Moreover, in view of the use of the NE edge sampler, in step 304 the condition that would be checked with respect to the data values would be "001" rather than "110". Furthermore, rather than using μ at step 308 and step 310, the nominal value μ would be negated so that (−μ) was used in the process instead.

Figure 6A:
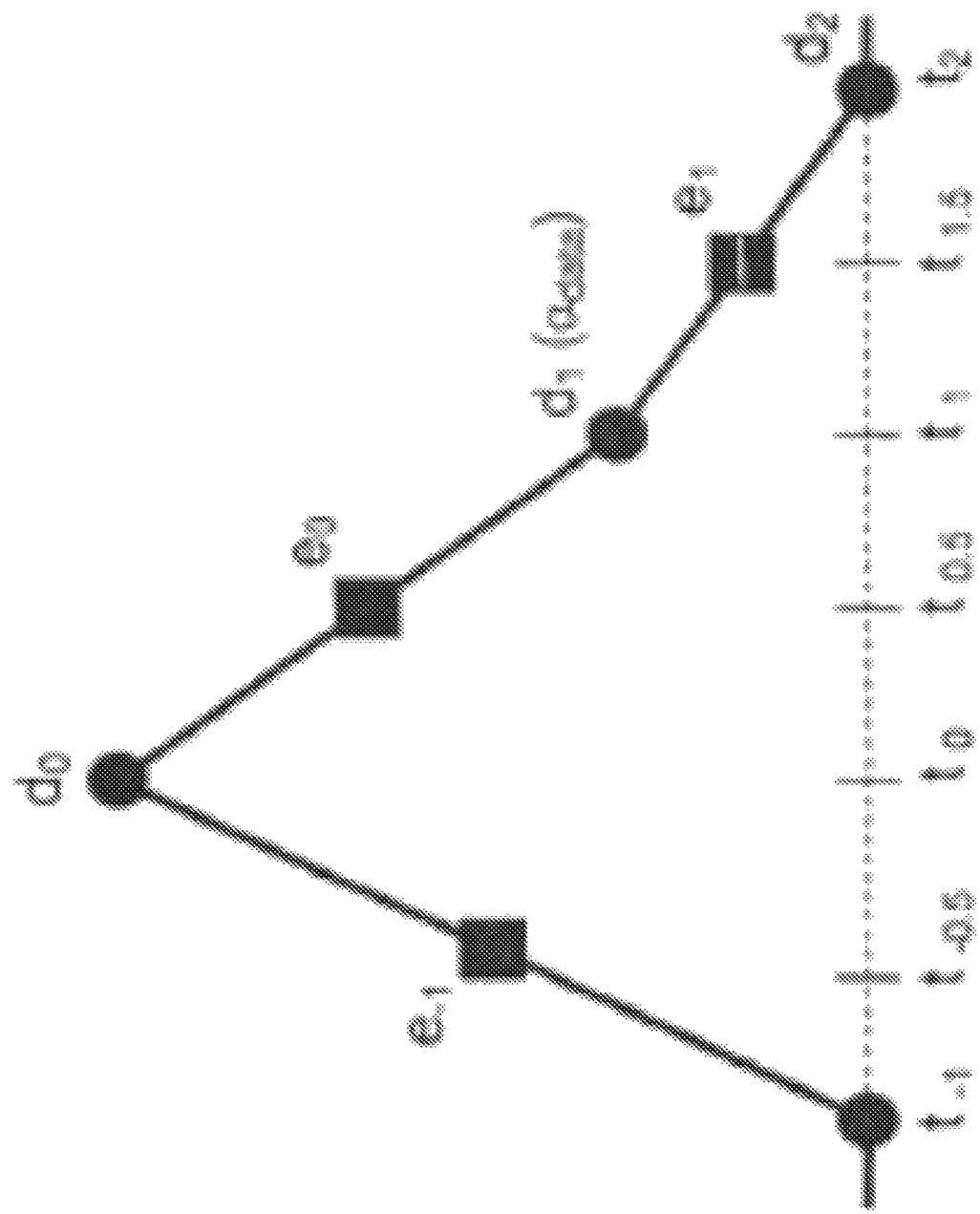
FIG. 6A is an approximate partial response decision feedback equalizer single bit response graph with linear approximation.

The application of edge-based sampling information to the operational adjustment of the data signal for ISI removal and the operation of the present equalizer/receiver technology may be further illustrated with respect to the graphs of FIGS. 6A and 6B. The graph of FIG. 6A represents an approximated single bit response of a channel associated with the equalizer 102 or 202 of the present technology. In the graph, time intervals associated with integers−1, 0, 1 and 2 (i.e., t$_{−1}$, t$_0$, t$_1$, t$_3$) represent times associated with sampling in consecutive data eyes. The time intervals associated with real numbers−0.5, 0.5, 1.5 (i.e., t$_{−0.5}$, t$_{0.5}$, t$_{1.5}$) represent times associated with sampling at the edges of consecutive data eyes. Transmission of the single d$_0$ data bit at the t$_0$ time results in a d$_1$ post-cursor ISI quantity at the t$_1$ time and zero ISI quantity at the t$_3$ time. The post-cursor ISI quantity d$_1$ is also labeled "α$_{data}$" and thus represents a quantity that optimally would be removed at time t$_1$ so that sampling of a data signal at the t$_1$ time would not be affected by that post-cursor ISI value (α$_{data}$).

The graph of FIG. 6B shows data levels and transitions corresponding to a single bit response of the prDFE receiver of the present technology. The four points on the T$_k$ line (e.g., 602A, 602B, 602C and 602D) along the left of the graph represent signal levels including ISI with respect to previously transmitted bits. Thus, the 602A point represents a received data signal including ISI as a result of a transmitted "11" data signal (i.e., [D$_{k−1}$, D$_k$]=[1, 1]). Similarly, the 602B, 602C and 602D points represent received data signals including ISI as a result of a respectively transmitted "01", "10" and "00" data signals.

The four points on the T$_{k+1}$ line (e.g., 604A, 604B, 604C and 604D) along the right of the graph represent signal levels including ISI as a result of a subsequent bit (e.g., D$_{k+1}$) that follows signal levels associated with the previously transmitted bits at points 602A, 602B, 602C and 602D. Thus, the 604A point represents the resultant signal with ISI for a subsequent D$_{k+1}$ bit of "1" in the received data signal following either the "11" or "01" received data signal respectively at points 602A and 602B. The 604B point represents the resultant signal with ISI for a subsequent D$_{k+1}$ bit of "1" in the received data signal following either the "10" or "00" received data signal respectively at points 602C and 602D. Similarly, the 604C and 604D points represent the resultant signal with ISI for a subsequent D$_{k+1}$ bit of "0" in the received data signal respectively following either (a) the "11" and "01" received data signal from points 602A and 602B respectively or (b) the "10" and "00" received data signal from points 602C and 602D respectively. The lines from time T$_k$ to time T$_{k+1}$ indicate the various possible transitions that the signal may make between these times, depending on the received data bits, according to the single bit response of FIG. 6A.

Significantly, points 608A, 608B, 608C indicate three signal levels that may be detected at the edge time in conjunction with the PE, ZE and NE edge samplers respectively as previously described herein. To this end, based on the continuous operation of the methods shown in FIGS. 3 and 5 utilizing PE, ZE and NE edge samplers in the edge analysis circuit 416 shown in FIG. 4, the sampling time of the edge clock signal s-clk$_{edge}$ generated by the timing generator 210 will be adjusted to lock to the ϕ$_1$ time shown in FIG. 6B. This will further result in the setting of the tap weight signals 207A, 207B to a signal level associated with the quantities shown on FIG. 6B as +α$_{edge}$ and −α$_{edge}$, which in view of the adjustment of the received data signal by these amounts, permits detection of the levels indicated by points 608A and 608C. Thus, given these tap weights use with the data samplers 208A, 208B, it thereby permits data sampling with effective sample timing and thresholds associated with points 608G and 608H, effectively compensating for the ISI amount α$_{data}$ of FIG. 6A by using the α$_{edge}$ of FIG. 6B. That is, the level measured for point 608A is used to approximate the ideal sampling threshold of 608G for distinguishing signals at levels 604A and 604C.

In a still further alternative embodiment, the timing generator 220, edge analysis circuit 216 and tap weight adapter circuit 214 may be implemented to lock the system to an edge time other than the one associated with ϕ$_1$ shown in FIG. 6B. For example, the system may be configured to lock to an edge time associated with ϕ$_2$ shown in FIG. 6B. In this embodiment, two edge samplers of the edge analysis circuit 216 may be configured to detect the signal levels shown at points 608E and 608F. To this end, the timing generator 220 may adjust the edge clock signal s-clk$_{edge}$ in response to data values of "110", "101", "010" and/or "001" from the data retention circuit 212. Thus, an edge sampler associated with point 608E may be checked for increasing or decreasing a delay of the edge clock signal s-clk$_{edge}$ in response to data values of "110" and "101". Similarly, another edge sampler associated with point 608F could be checked for increasing or decreasing a delay of the edge clock signal s-clk$_{edge}$ in response to data values of "001" and "010". Either or both of these samplers may be used in the determination of the edge clock signal s-clk$_{edge}$ if present. However, by utilizing both, the edge clock signal is more likely to settle or lock to the desired time faster, which is the edge time associated with $\phi_2$ in this case.

In this embodiment, the method of FIG. 3 may be used with the edge sampler associated with point 608E by checking for data values of either "110" or "101" in step 304 or with the edge sampler associated with point 608F by checking for data values of either "010" or "001" in step 304. However, in the determination of the tap weight setting with the tap weight adapter circuit in this embodiment using the steps of the method of FIG. 3, use of either of the edge samplers associated with points 608E or 608F to generate the tap weight signals as previously described would not result in an alpha value for the tap weight signals 207A, 207B that would be comparable to $\alpha_{data}$ as shown in FIG. 6B without additional adjustments. Rather, it would result in an amount shown in FIG. 6B as $e_1$. This $e_1$ is comparable to the edge ISI component at the $t_1.5$ time shown in FIG. 6A. As illustrated by the line between $d_1$ and $d_2$ in FIG. 6A, by linear approximation, this $e_1$ quantity may be doubled to yield a quantity comparable to the ISI component $\alpha_{data}$. Thus, in adjusting the tap weight signals used for data sampling, the value $e_1$ (determined by the method of FIG. 3 using an edge time associated with $\Phi_2$ may then be doubled to approximate $\alpha_{data}$. Thus, in this embodiment, the alpha signal generated by the tap weight adapter circuit would be doubled for adders 206A, 206B associated with the data samplers 208A, 208B but would not be doubled for use by the edge samplers of the edge analysis circuit 216. This doubling may be easily accomplished by further logic of the adapter circuit 214 that effect the 2X multiplication by a digital data shift operation, or in the analog domain by an appropriate scaling block such as a current mirror with a gain of 2. In this case, the tap weight adapter circuit 214 of FIG. 2 could output the values+e1 and −e1 as alpha values for the edge analysis circuit 216 and also output two times these values (e.g., 2*(−$e_1$) and 2*(+$e_1$)) as alpha values for the tap weights of adders 206A, 206B. Thus, additional signal lines between the circuit elements for these different alpha values may be added to the embodiment shown in FIG. 2 as necessary. In this way, the embodiment of the system may reduce the data eye ISI component based on an analysis of the ISI component at the edges of the data eye.

The equalizer circuits 102, 202 as discussed herein may be realized on one or more integrated chips. It may be part of the integrated circuits of digital processing devices, computers, computer peripherals, graphics processing devices, etc. By way of example, the circuits may be implemented as part of a central processing unit or CPU as commonly employed in a digital computer or may be employed as an intermediary between the CPU and other circuit chips. Thus, circuits as discussed herein can be incorporated in the communication path between a processor such as a CPU and a cache memory. Thus, received data signals may be baseband data signals that are transmitted between circuit components of a common apparatus without modulation on a carrier wave or demodulation thereof. The technology may also be implemented as elements of point-to-point connections according to protocols such as PCI Express, Serial ATA and other protocols. The technology can also be used with bus connections, i.e., arrangements in which the same signal is sent to plural devices connected to the same conductors. The receiver/equalizer can even be implemented for parallel links such as buses or any other device implementing parallel communications. In other embodiments, the circuits may be an element of data input or output device controllers or the like, such as a memory controller.

For example, in a memory controller embodiment, the memory controller generally acts as the device that sends data to the memory for a writing operation and receives data back from the memory for a reading operation. The equalizer circuit 102, 202 may be implemented to receive signals sent from either or both of the memory and memory controller and may be realized in either or both of these devices.

In general, each of the circuits implemented in the technology presented herein may be constructed with electrical elements such as traces, capacitors, resistors, transistors, etc. that are based on metal oxide semiconductor (MOS) technology, but may also be implemented using other technology such as bipolar technology or any other technology in which a signal-controlled current flow may be achieved.

Furthermore, these circuits may be constructed using automated systems that fabricate integrated circuits. For example, the components and systems described may be designed as one or more integrated circuits, or a portion(s) of an integrated circuit, based on design control instructions for doing so with circuit-forming apparatus that controls the fabrication of the blocks of the integrated circuits. The instructions may be in the form of data stored in, for example, a computer-readable medium such as a magnetic tape or an optical or magnetic disk. The design control instructions typically encode data structures or other information or methods describing the circuitry that can be physically created as the blocks of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology. For example, the illustrative embodiments using the circuits associated with detecting tap weights based on either $\phi_1$ or $\phi_2$ may be combined for generating tap weights based on both detection methods such that the resulting tap weights may be combined from both determinations. Moreover, the equalizer/receivers described herein may be combined with other transmit equalization circuitry and/or error correction circuitry for maintaining good high speed signal transfer characteristics on any given transmission channel. Additionally, although wired channels are explicitly discussed, wireless channels may also be implemented with the technology such that wireless transmissions may be made between chips using wireless transmitters and receivers that operate by, for example, infrared data signals or electromagnetic data signals sent between the circuit blocks of the technology. Similarly, the channels may be implemented with capacitive, inductive and/or optical principles and can use components for such channels, such as the transmitter and receiver technology capable of transmitting data by such channels.

What is claimed is:

1. An integrated circuit (IC) chip, comprising:
   receiver circuitry to receive signals from a second IC chip, the receiver circuitry including
   equalization circuitry having at least one tap to equalize the signals, the equalization circuitry including a tap weight adapter circuit to generate at least one tap weight corresponding to the at least one tap based on edge information of previously received signals.

2. The IC chip according to claim 1, wherein the adapter circuit is to generate the at least one tap weight based on an edge analysis of the edge information.

3. The IC chip according to claim 2, wherein the edge analysis is based on multiple edge-sampled data signals.

4. The IC chip according to claim 1, wherein the equalization circuitry includes a decision-feedback equalizer (DFE).

5. The IC chip according to claim 4, wherein the DFE includes a partial response decision-feedback equalizer (PrDFE).

6. The IC chip according to claim 5, wherein the PrDFE includes parallel alternative decision paths, and the signals are received along each of the parallel alternative decision paths.

7. The IC chip according to claim 6, wherein the equalization circuitry adjusts a voltage of the signals in accordance with the at least one tap weight along each of the parallel alternative decision paths.

8. An integrated circuit (IC) chip, comprising:
   circuitry to interface with a second IC chip via multiple links, the circuitry including multiple receivers, each receiver to receive signals via a corresponding link and comprising
   an equalizer having at least one tap to equalize the signals in accordance with at least one equalizer coefficient corresponding to the at least one tap; and
   a tap weight adapter circuit to generate the at least one equalizer coefficient from edge-based sampling information associated with prior received signals.

9. The IC chip according to claim 8, wherein the at least one equalizer coefficient is further based on a received pattern of bits in the prior received signals.

10. The IC chip according to claim 8, wherein the equalizer comprises a decision-feedback equalizer (DFE).

11. The IC chip according to claim 8, wherein the equalizer comprises a partial response decision-feedback equalizer (PrDFE).

12. The IC chip according to claim 11, wherein the PrDFE includes parallel alternative decision paths, and the signals are received along each of the parallel alternative decision paths.

13. The IC chip according to claim 12, wherein the equalizer adjusts a voltage of the signals along each of the parallel alternative decision paths.

14. The IC chip according to claim 8, wherein the tap weight adapter circuit is to generate the at least one equalizer coefficient based on an edge analysis of the edge-based sampling information.

15. A method of operation in an integrated circuit (IC) chip, the method comprising:
    receiving signals from a second IC chip, the receiving including
    applying data level equalization to the signals with at least one tap of an equalizer, and
    adaptively generating at least one tap weight corresponding to the at least one tap based on edge information of previously received signals.

16. The method according to claim 15, wherein the adaptively generating the at least one tap weight comprises:
    adaptively generating the at least one tap weight based on an edge analysis of the edge information.

17. The method according to claim 16, wherein the edge analysis is based on multiple edge-sampled data signals.

18. The method according to claim 15, wherein the applying data level equalization is carried out by a decision-feedback equalizer (DFE).

19. The method according to claim 15, wherein the applying data level equalization is carried out by a partial response decision-feedback equalizer (PrDFE).

20. The method according to claim 15, wherein the applying data level equalization includes adjusting a voltage of the signals along each of multiple parallel alternative decision paths.

* * * * *